US007208057B2

(12) United States Patent
Weisser

(10) Patent No.: US 7,208,057 B2
(45) Date of Patent: Apr. 24, 2007

(54) METHOD FOR AVOIDING AIR POCKETS IN A JOINT BETWEEN TWO STRUCTURAL COMPONENTS

(75) Inventor: Tilmann Weisser, Stade (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/838,652

(22) Filed: May 3, 2004

(65) Prior Publication Data
US 2004/0236454 A1 Nov. 25, 2004

(30) Foreign Application Priority Data
May 2, 2003 (DE) ............... 103 19 926

(51) Int. Cl.
B29C 73/06 (2006.01)
B32B 41/00 (2006.01)
B32B 43/00 (2006.01)
(52) U.S. Cl. .................... 156/64; 156/98; 156/94; 156/286; 264/36.22; 264/36.1
(58) Field of Classification Search ............... 156/64, 156/91, 92, 94, 98, 285, 286, 378, 379; 29/402.01, 29/402.11, 402.09, 402.18; 264/36.22, 36.1; 427/140; 700/110, 109
See application file for complete search history.

(56) References Cited
U.S. PATENT DOCUMENTS 3,041,231 A * 6/1962 Fountain ............... 156/254
4,147,576 A * 4/1979 Beem et al. ............ 156/94
4,980,005 A 12/1990 Scollard
5,385,050 A 1/1995 Roberts
5,879,540 A * 3/1999 Zinke et al. ............ 208/321
5,963,660 A 10/1999 Koontz et al.
6,174,392 B1 * 1/2001 Reis ...................... 156/58
6,385,836 B1 * 5/2002 Coltrin ................... 29/402.18
6,849,150 B1 * 2/2005 Schmidt ................. 156/285
2002/0078545 A1 6/2002 Munk et al.

FOREIGN PATENT DOCUMENTS

DE 41 36 653 5/1993
DE 197 39 885 3/1999
EP 0 089 954 12/1987
EP 1 004 361 5/2000

* cited by examiner

Primary Examiner—George Koch
(74) Attorney, Agent, or Firm—W. F. Fasse; W. G. Fasse

(57) ABSTRACT

When two structural components are to be joined, for example, when an aircraft skin section is to be secured to a stringer by an adhesive bonding, it is important that the joining surface areas are plane to avoid the formation of air inclusions in the joint because air inclusions weaken the mechanical strength of the joint. Thus, a surface topography that is not plane must be smoothed out prior to the joining. For this purpose the surface areas to be joined are optically scanned to provide topographical information for each surface area that needs to be smoothed out for providing a plane joining surface. The topographical information is processed to ascertain the configuration and volume of the surface topography that needs to be filled with a filler material to produce a plane surface or at least a smooth surface without hills and dales. A respective control signal is produced and fed to a dosing equipment which supplies the exact volume of filler material required for planing or smoothing the surface topography. When smoothing is completed the two components are ready for joining for example by the application of pressure and heat to the filler material.

14 Claims, 4 Drawing Sheets

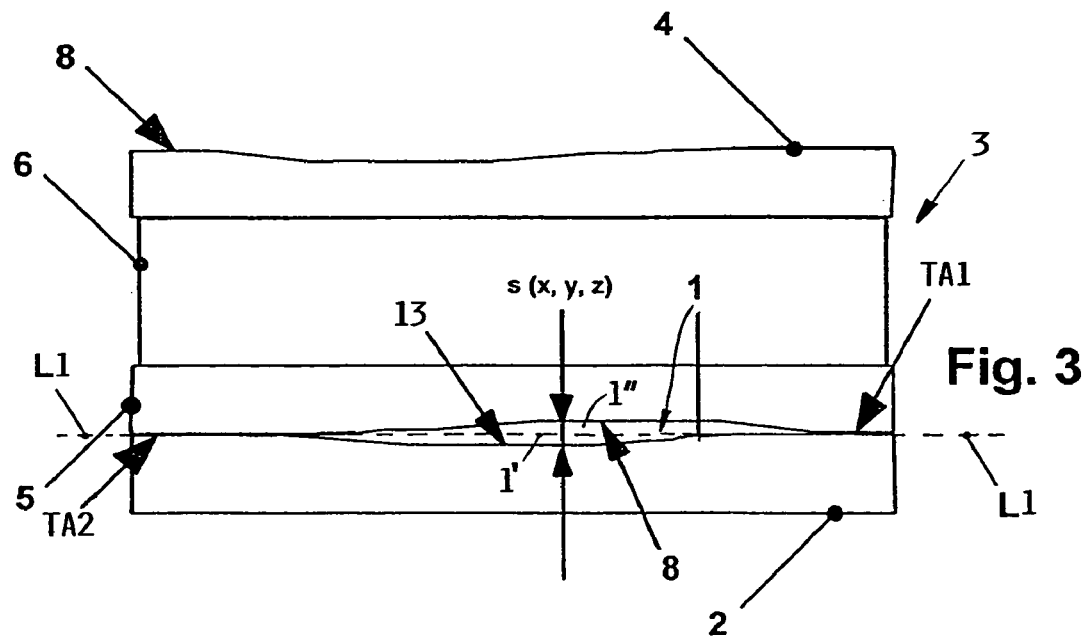
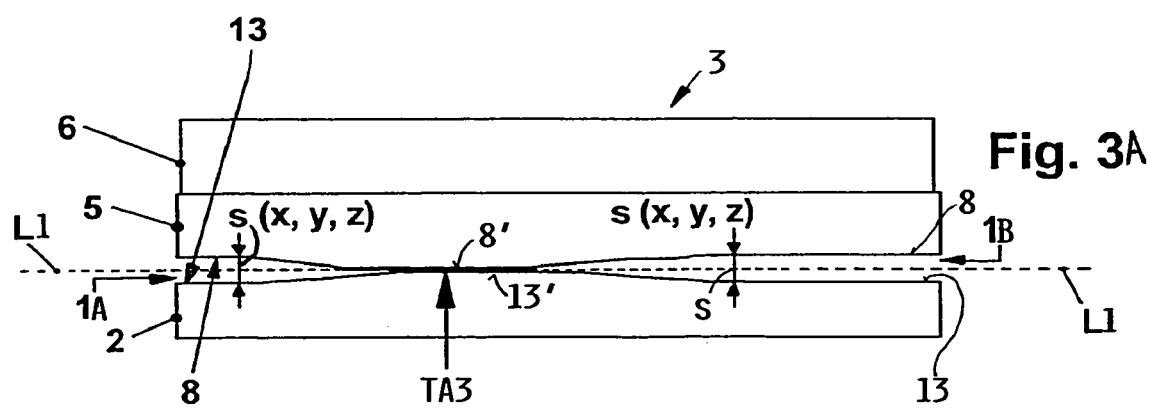

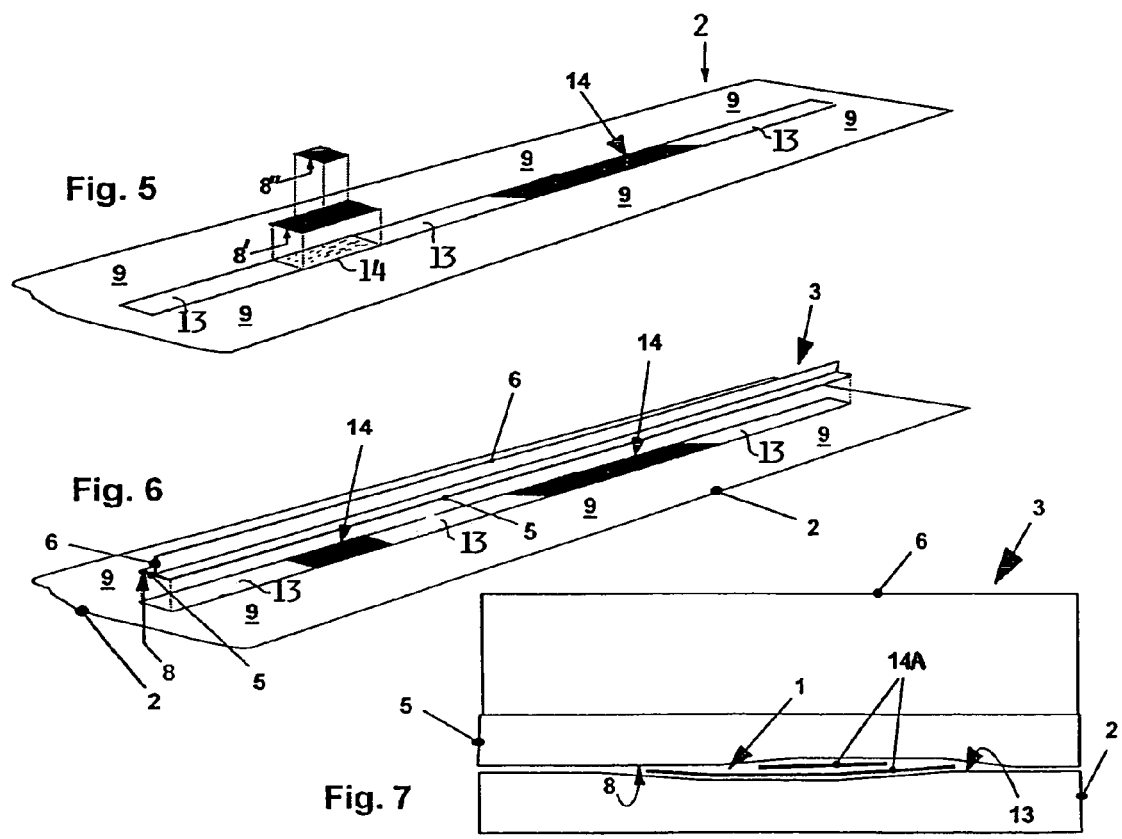

METHOD FOR AVOIDING AIR POCKETS IN A JOINT BETWEEN TWO STRUCTURAL COMPONENTS

PRIORITY CLAIM

This application is based on and claims the priority under 35 U.S.C. §119 of German Patent Application 103 19 926.8, filed on May 2, 2003, the entire disclosure of which is incorporated herein by reference.

FIELD OF THE INVENTION

The invention relates to a method for precisely filling or leveling joining surfaces that form a joint between two structural components such as a body skin and a stringer in an aircraft body, whereby air pockets in the joint are avoided.

BACKGROUND INFORMATION

Fiber reinforced composite materials particularly carbon fiber reinforced composite materials are used in aircraft construction. Conventionally thin stringers and thin skin sections made of these carbon fiber reinforced materials are used, for example in passenger aircraft of the "Airbus" (Tradename) type. Stringers and skin sections are interconnected by adhesive bonding or riveting. The skin surface areas and the stringer surface areas to be joined are not uniformly smooth or level so that joining gaps or air pockets occur. These joining gaps need not occur throughout the joined surface areas. Rather, joining gaps may occur depending on the topography of the surfaces to be joined. Thus, these joining gaps may be randomly distributed between the surfaces being joined. These joining gaps or air pockets are undesirable since they reduce the mechanical strength of the joint. To avoid joining gaps it is known to use a so-called shim mass to fill the gap or gaps. The quantity of shim mass is determined by a maximal gap dimension. However, such maximal gap dimension is not always achieved in the manufacture of the individual stringers and skin sections. As a result, it is possible to apply too much shim mass and the excess must be removed which is rather cost intensive and time consuming. Conventionally, it is difficult to determine the exact quantity of the required shim mass because the gap depth is not uniform throughout the gap area. Rather, a hill and dale topography, in a micro sense, is involved. Prior to an adhesive bonding, for example of a stringer with a skin section, the joining surface area of the skin section is smoothed out with the shim mass, then both surface areas are coated with an adhesive and pressed against each other. When the adhesive has cured, the connection or joint is permanent and provides a self-retaining material bonding.

Riveting structural components to each other also leaves room for improvement with regard to eliminating the need for a mechanical preparation of the joining surfaces of the components to be connected. Preparing the joining surfaces, for example by the fine grinding or polishing so that these surfaces are completely or at least substantially plane and do not form any gap, is cost intensive and time consuming. Thus, fine grinding and polishing of these joining surface areas should be avoided.

Furthermore, the above conventional joining methods are not suitable for connecting relatively thick walled components to each other such as skin sections and stringers made of carbon fiber reinforced composite materials. Such components are relatively rigid. The dimensions of gaps that form between or rather on the joining surfaces of rigid thick structural components depend on the manufacturing tolerances that must be accepted for economic reasons. Rigid components if pressed to each other do not allow for minimizing the gap dimensions due to their rigidity. Prior art solutions as described in European Patent Publication EP 0,089,954 B1, German Patent Publication DE 197 39 885 A1, and US Patent Publications U.S. Pat. No. 4,980,005 as well as U.S. Pat. No. 5,963,660 do not provide any solutions for the above outlined problems.

OBJECTS OF THE INVENTION

In view of the foregoing it is the aim of the invention to achieve the following objects singly or in combination:

to precisely fill any joining gaps or rather joining gap portions between or on joining surface areas of structural components with due regard to the individual topographies of the surface areas to be joined to thereby avoid air pockets in the joints;

to eliminate or prevent the formation of gaps with large dimensions and gaps between thick walled, rigid structural components to be joined;

to avoid excessive filling of the volume of gap portions regardless of the gap configurations and dimensions also referred to as gap topographies;

to assure a self-retaining material bonding of the materials to be joined thereby avoiding any air inclusions in the joint when the joint is finished;

to assure that neither too much nor too little filler material is supplied for the smoothing out of the surface topographies with random hill and dale configurations;

to assure that following the smoothing of the topographies a cost efficient, time efficient, and rational joining of the structural components is possible; and to use gap filler materials that have a powder or paste consistency, or materials that are preformed as a sticker material or sticker tape, or materials which are solid in the form of strips, bands or the like.

SUMMARY OF THE INVENTION

The above objects have been achieved according to the invention by the combination of the following steps in a method for joining a first joining surface area of a first structural component to a second joining surface area of a second structural component, wherein the formation of a joining gap and thus air pockets is prevented between said first and second joining surface areas when said first and second structural components are joined to each other, said method comprising the following steps according to the invention.

a) scanning said first joining surface area and said second joining surface area for providing first and second topographic informations defining varying dimensions of gap portions of said joining gap, b) feeding said first and second topographic informations to a central processing unit, c) calculating in said central processing unit on the basis of said first and second topographic informations at least a volume of said joining gap, d) generating, based on said volume of said joining gap a dosing control signal, e) controlling with said dosing control signal a gap filler material supply and dosing device for providing a quantity of gap filler material corresponding to said volume of said joining gap, and f) filling said quantity of gap filler material into at least one topography of said first and second topographies of said first and second joining surface areas.

When the smoothing out steps are completed the joint is formed by joining said first and second structural components to each other whereby said gap filler material fills completely, said joining gap to prevent the formation of air inclusions in the joint.

By controlling the supply of filler material in accordance with the measured topography of both surface areas to be joined, the invention achieves the advantage that the application of excess filler material is avoided. The supply of too little filler material that would leave gaps of reduced dimensions or small air pockets is also avoided. Yet another advantage is seen in that rigid thick walled structural components can now be joined without air pockets in the joint. Further, the use of sticking filler material permits applying the filler material in correct quantities to each joining surface area of each structural component to be joined because the sticking filler material will stick to the topography of the joining surface area even when the respective structural component is turned around after an adhesive has been applied so that the joining surface areas face each other prior to pressing the structural components to each other for completing the joining.

BRIEF DESCRIPTION OF THE DRAWINGS

In order that the invention may be clearly understood, it will now be described in connection with example embodiments thereof, with reference to the accompanying drawings, wherein:

FIG. 3 shows a sectional view through a stringer positioned on a skin section to illustrate the formation of a joining gap between the two joining surface areas which gap must be filled and smoothed or leveled out prior to the joining;

FIG. 3A is a view similar to that of FIG. 3, however showing portions of two additional gaps that are open sideways and must also be filled and smoothed or leveled out prior to the joining;

FIG. 5 shows perspectively a skin or shell section with a joining surface area that has been smoothed out by filler material prior to the actual joining;

FIG. 6 is a view similar to that of FIG. 5, but now illustrating the positioning of a stringer with its joining surface area facing the joining surface area of the skin section just prior to joining; and FIG. 7 shows an embodiment which uses pieces or strips of solid filler material for filling a gap between a stringer and a skin section prior to the actual joining step.

DETAILED DESCRIPTION OF A PREFERRED EXAMPLE EMBODIMENT AND OF THE BEST MODE OF THE INVENTION

Figure 1:
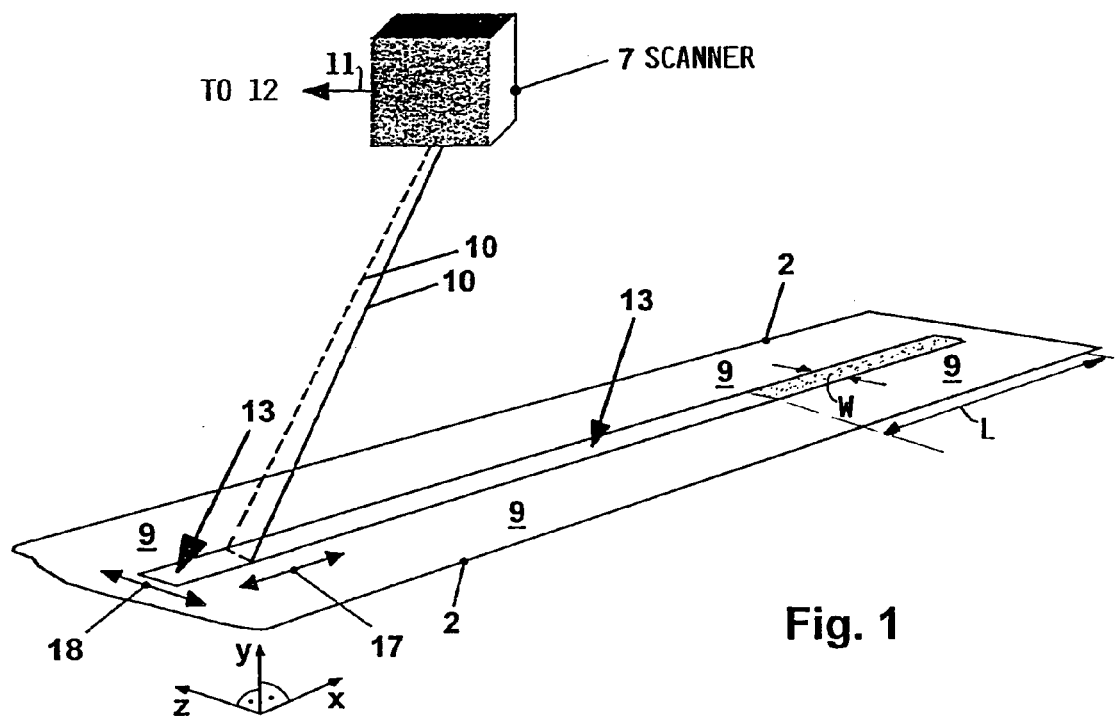
FIG. 1 shows a schematic perspective view of a scanner positioned for scanning a first joining surface area of a skin or shell section to be joined to a stringer.

FIG. 1 shows perspectively a first structural component such as a skin or shell section 2 having a relatively thick wall with an inwardly facing surface 9. A portion of the inwardly facing surface 9 of the skin section 2 forms a first joining surface area 13 that will be joined or bonded by an adhesive to a second joining surface area 8 of a second structural component 3 such as a stringer 3 to be described in more detail below. In practice the first and second joining surface areas 13 and 8 are not exactly plane due to acceptable manufacturing tolerances. Thus, it is the purpose of the invention to provide a method to level out or smooth out any topographic irregularities in the surface areas 13 and 8 to avoid the formation of air pockets in the finished joint.

Without such smoothing or leveling air pockets of various geometric configurations could be formed and it is the purpose of the invention to avoid such faulty gap formations. For this purpose the topography of the first joining surface area 13 is scanned, for example by a laser scanner 7 that directs a scanning beam 10 onto the first joining surface area 13, whereby the scanning beam 10 is moved longitudinally as indicated by the arrow 17 and crosswise to the longitudinal direction as indicated by the arrow 18. One scanner can be used for sequential scanning of both structural components. Two scanners can be used for simultaneous scanning of both structural components.

Figure 2:
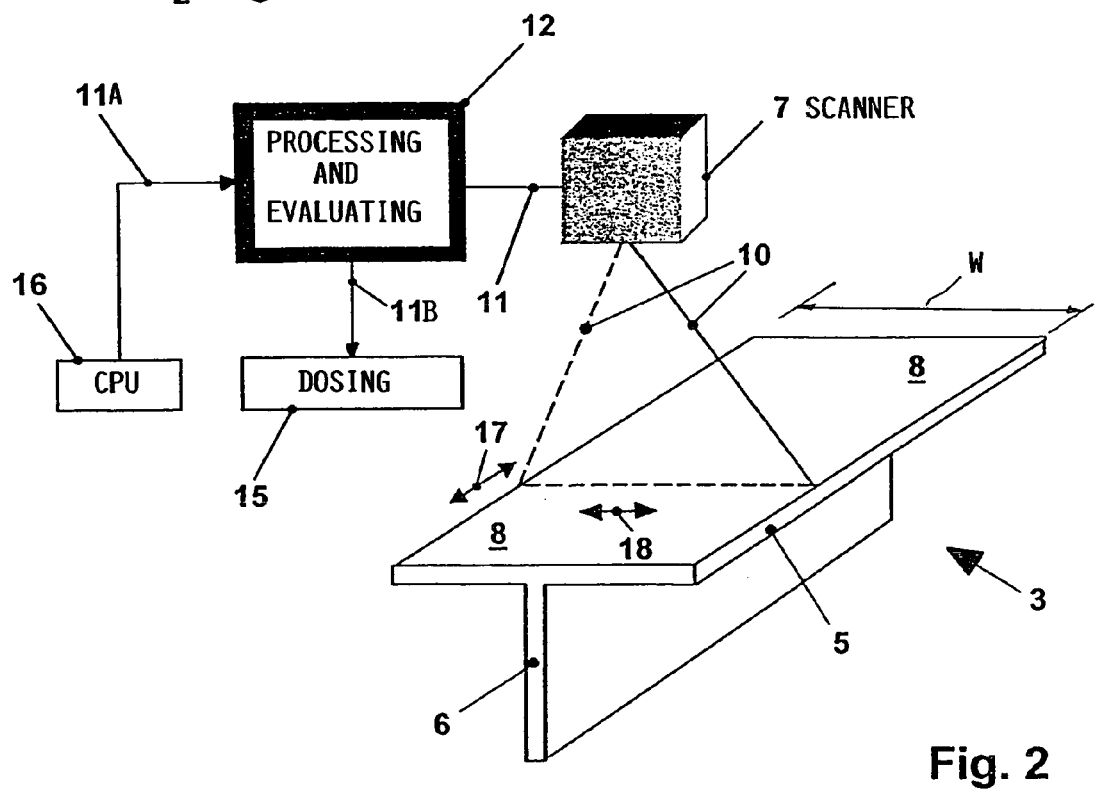
FIG. 2 shows a perspective view of a scanner positioned for scanning a joining surface area of the stringer to be joined to the surface area of the skin section of FIG. 1.

The output 11 of the scanner 7 is connected to a control and evaluating unit 12 shown in FIG. 2. The respective output signals of the scanner 7 contain the topographic information regarding the first joining surface area 13. FIG. 1 also shows symbolically the three coordinates of space x, y, z. The topographic information contains gap portion dimensions in the three directions.

FIG. 2 shows a portion of a stringer 3 in the form of a T-section with a web 6 and a chord 5. An outwardly facing surface of the chord 5 forms the second joining surface area 8 which is scanned by the scanner 7 whose output 11 is also connected to the control and evaluating unit 12 which is controlled by a central processing unit (CPU) 16 through a control bus 11A. Regardless, whether one or two scanners are used, in both instances the control and evaluating unit 12 generates a calculated control signal on its output 11B which is supplied to a filler material supply and dosing unit 15 which may also include a material cutter or the like and a length measuring device as will be described in more detail below.

The skin section 2 and the stringer 3 are generally made of carbon fiber reinforced composite materials (CFCs) which have relatively thick walls sufficient to make these structural components 2 and 3 stiff or rigid. The skin sections 2 have generally a concave configuration to fit the contour of the aircraft body. The stringers 3 may have an I-sectional configuration or a T-sectional configuration or an H-sectional configuration.

The final joining takes place with conventional adhesives preferably under pressure and heat. Adhesive and additional material plies may be inserted between the two structural components or rather between the joining surface areas for beneficially influencing the final joining. Additionally, a thermal welding may be performed along the edges of the chord sitting on the joining surface area 13. Referring to FIG. 3 the formation of a gap 1 and its topography will now be described. These gaps 1 occur because the joining surface areas 8 and 13 of the stringer 3 and of the skin section 2 are not exactly plane. Mechanical planing, for example by mechanical material removal, involves prohibitive costs and is to be avoided according to the invention.

In FIG. 3 the joining gap 1 has two portions 1' and 1" that are formed by topographic depressions or hills and dales in the first joining surface area 13 and in the second joining surface area 8. The first gap portion 1' in the surface 13 of the skin section 2 is initially separated from the second gap portion 1" in the surface area 8 of the stringer chord 5 by a line or plane L1—L1. The plane L1—L1 passes through the plane touch areas TA1 and TA2 between the surface area 9 of the skin section 2 and the surface area 8 of the stringer chord 5. In the touch areas TA1 and TA2 there are no depressions that could form air pockets when the joining is completed. The volume of the joining gap 1 is determined by the sum of the volumes of the gap portions or depressions 1' and 1" as will be described in more detail below. For this purpose it is necessary to ascertain the gap width s as a function of space, namely in the x, y and z directions. This gap width s varies throughout the gap area.

FIG. 3A illustrates the formation of additional gaps 1A and 1B due to hills 13' in the topography of the surface 13 of the skin section 2 and due to hills 8' in the topography of the chord surface of the stringer 3. These hills 8' and 9' form touch areas TA3. The additional gaps 1A and 1B are formed as valleys outside these touch areas TA3 whereby again a line or plane L1—L1 passes through the hill tops, so to speak, to define the volumes of the respective gap portions above and below this line or plane L1—L1. Again the gap width s of each gap 1B and 1A will differ from point to point in the three directions of space x, y, z.

Figure 4:
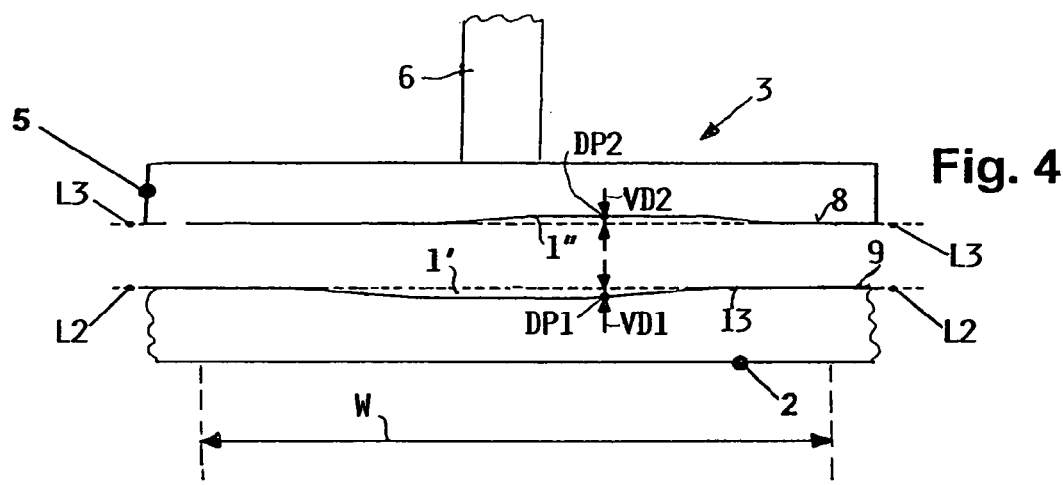
FIG. 4 shows a sectional view through a stringer and a skin section spaced from each other prior to joining to illustrate that a gap is formed by two gap portions, whereby one gap portion is present in the joining surface area of the stringer while the other gap portion is present in the joining surface area of the skin section.

FIG. 4 illustrates the formation of the gap portion 1' in the skin section 2 and the gap portion 1" in the stringer 3. Incidentally, the stringer 3 may be a spar in an aircraft wing or a girder or beam forming part of the floor support in an aircraft body. A vertical depth VD1 is formed in the gap portion 1' of the skin section 2 at a depth point DP1. Varying depths are formed from depth point to depth point depending on the surface topography of the surface 8 and 13. More specifically, the vertical depths VD1 are formed between the depth point DP1 and the line or plane L2—L2. Similarly, a vertical depth VD2 is formed in the gap portion 1" in the surface 8 of the stringer chord 5 at a depth point DP2. More specifically, the vertical depth VD2 is formed between the depth point DP2 and the line or plane L3—L3.

Figure 4A:
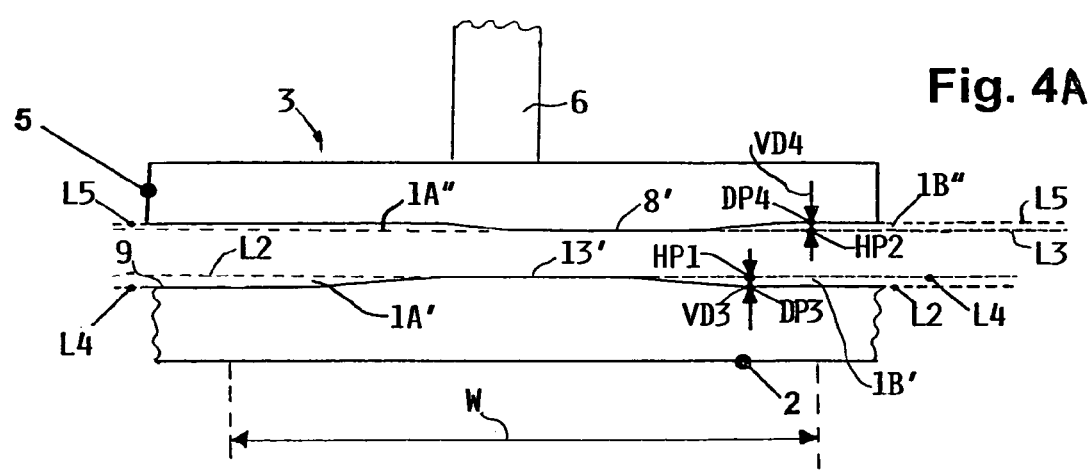
FIG. 4A is a view similar to that of FIG. 4, however showing that gap portions can also be formed by a topography which has projecting hills so that the gap portions are formed in the neighboring dales.

FIG. 4A illustrates that the additional gaps 1A and 1B are also made up of respective gap portions 1A' and 1A" of the gap 1A and 1B' and 1B" of the gap 1B. The vertical depth VD3 between the depth point DP3 and the high point HP1 is formed between the planes L2—L2 and L4—L4 at the high point HP1 and depth point DP3. Similarly, the vertical depth VD4 is formed between the high point HP2 and the depth point DP4 which are positioned on the plane L3—L3 and the plane L5—L5, respectively. In both FIGS. 4 and 4A the view is in the longitudinal direction of the stringer 3, hence the width W of the first joining surface area 13 on the skin section 2 is shown. The chord 5 of the stringer 3 has the same width W. The two additional gaps 1A formed by the gap portions 1A' and 1A" and the gap 1B formed by the gap portions 1B' and 1B" are open laterally when the stringer 3 with its chord 5 is pressed onto the joining surface area 13 of the skin section 2.

FIG. 5 shows perspectively a skin section 2 having an inwardly facing, somewhat concave surface 9 with the first joining surface 13. Two gap areas have been filled with filler material 14. The calculation of the required quantity or rather volume of filler material will be described in more detail below. Two portions 8' and 8" of the second joining surface area 8 of the stringer 3 have also been smoothed out as symbolically shown in FIG. 5. The filler material 14 is, for example a filler powder or paste that has been smoothed into the topographic depression areas of the first joining surface area 13.

FIG. 6 shows the stringer 3 in a position just prior to contacting with its second joining surface area 8 the first joining surface area 13. The stringer 3 has, for example a T-cross-sectional configuration and the chord 5 faces with its surface area 8 the surface area 13.

FIG. 7 shows a gap 1 that is amenable for being filled with pieces 14A of filler material rather than with a filler powder or paste.

In order to calculate the volume of each joining gap 1, 1A, 1B or joining gap portions 1A', 1A", 1B' and 1B" it is necessary to obtain the topographical information of the areas that are congruent with these joining gaps. The gap depths varies throughout the gap area unless a particular topographical depression has a uniform depth throughout the area covered by the particular topographical depression. In order to obtain the required topographical information the invention teaches to scan the joining surface areas prior to joining.

The topographical information is based on the length L and width W of a joining surface area portion that requires smoothing out or leveling with a filler material. This information is also based on the varying vertical depths VD1 and VD3 of the gap portions 1', 1A' and 1B' in the first structural component 2 such as a skin or shell section. This information is also based on the varying vertical depths VD2 and VD4 of the gap portions 1", 1A" and 1B" in the second structural component 3 to be joined with the first structural component 2. In case only one of the joining surface 3 areas to be joined comprises topographic irregularities in its surface, information will be provided only for the joining surface that has such irregularities which require filling and smoothing out with a filler material. It does not matter which of the two joining surface areas is smooth since both joining surface areas will be scanned. It is then necessary merely to calculate the volume and configuration of one gap portion rather than of two gap portions that together form a gap 1 or 1A or 1B. When one of the joining surfaces is completely plane the gap is then formed by one gap portion in the other joining surface or vice versa. The probability that both joining surfaces are completely plane and smooth is small.

Referring to FIG. 4, the above mentioned varying, vertical depths including VD1 are determined by the scanning between depth points DP1 and the plane L2—L2 coinciding with the plane portions of the joining surface area 13. The vertical, varying depths including VD2 are determined by scanning between depth points DP2 and a line or plane L3—L3 coinciding with the plane portions of the joining surface area 8 of the second structural component such as a stringer 3, a spar, a beam or a girder.

Referring to FIG. 4A, the varying, vertical depths including VD3 are determined by the scanning between high points HP1 of the topography of the gap portion 1B' and depth points DP3. The high points HP1 coincide with the line or plane L2—L2. The depth points DP3 coincide with a line or plane L4—L4. Thus, these depths VD3 are measured between the two planes L2 and L4 outside the touch areas 8' and 13'. Similarly, the varying vertical depths VD4 are determined by the scanning between the high points HP2 and the depth points DP4. The high points HP2 coincide with a line or plane L3—L3. The low or depth points DP4 coincide with a line or plane L5.

Referring to FIG. 1, the topographic informations acquired by the scanner 7 are transmitted for example through a data bus 11 to the processing and evaluating unit 12 which is connected, for example, by a further data bus 11A to a central processing unit (CPU) 16. The topographic informations of two joining gap portions for example 1A' and 1A" forming a gap 1A are evaluated by the processing and evaluating unit 12 under the control of a computer 16. The CPU 16 has stored in its memory the required program or programs and any parameters required for the topographical calculations to obtain the quantity or volume and configuration of the gap portions 1', 1", 1A', 1A", 1B', 1B" and to further obtain the volume and configuration of the respective gaps 1, 1A, 1B. The unit 12 also converts the just described topographical information into control signals for a filler material supply dosing unit 15 connected to the unit 12 by a further data bus 11B. The filler material supply and dosing unit 15 provides the exact quantity, in terms of gap volume and gap configuration, of filler material for filling and smoothing any particular gap. The filler material may be a powder or paste or it may be solid in the form of strips. For dosing the correct length of a strip filler material the unit 15 includes a cutter such as an ultrasound cutter for cutting filler material pieces 14A shown in FIG. 7. The required length of the individual filler material pieces 14A may be measured by any suitable length measuring device, e.g. an ultrasound length meter that provides respective control signals for the cutter not shown.

The dosed quantities of filler material may be transferred manually or by suitable robot machinery to the joining surface areas. Such machinery may be remote controlled. Where two gap portions are forming a gap, as described above, the quantity of filler material in powder form deposited on one gap portion will be sufficient to fill both gap portions when the second structural component 3 with its joining surface area 8 is pressed down on the first joining surface area 13 of the first structural component 2. Where paste or otherwise sticking filler material is used the filler material will remain attached to the surface 8 even if the stringer 3 is turned around so that the surface 8 faces down for contacting the surface area 13.

Rather than using one or two laser scanners 7 other optical topography measuring systems may be used, such as photogrammetry systems, light section methods using light line projections, and any other suitable optical measuring system.

The filler material is, for example, a glass fiber reinforced composite material (GFC), a carbon fiber reinformed composite material (CFC) or any other suitable material. Further, the present method is equally practicable for any materials of which the first and second structural components 2 and 3 may be made, such as GFCs, CFCs, metals, particularly lightweight metals such as aluminum. Further, the filler material strips may be coated with an adhesive bonding material such as a resin film, whereby the pieces 14A can be handled just like a sticker. Different filler materials and different filler material consistencies, e.g. powders, pastes, strips, stickers may be used singly or in combination.

The invention assures that any kind of gap with any kind of topography is completely filled and air inclusions are avoided. Extra filler material may be placed along the edges of the chord of the second structural component to form tight seams which may for example be formed or reinforced by thermal welding. Another advantage of the invention is seen, in that the present method can be used for joining thick walled rigid structural components and for smoothing out deep and wide gaps. Further, the present method can accommodate substantial structural component surface tolerances which are required in the manufacturing of such structural components for economic reasons.

Incidentally, if one joining surface of two joining surfaces does not happen to have any topographic irregularities, the respective topographic information resulting from the scanning will be zero.

The calculation is then based on the topography of one gap portion that needs to be filled and smoothed out to avoid air pockets.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of joining a first joining surface area (13) of a first structural component (2) to a second joining surface area (8) of a second structural component (3) at a joint therebetween, including filling a joining gap between said first and second joining surface areas (13, 8) when said first and second structural components are joined to each other, said method comprising the following steps:
    a) scanning said first joining surface area (13) and said second joining surface area (8) to provide first and second topographic informations defining varying gap dimensions (s) of gap portions of said joining gap (1),
    b) feeding said first and second topographic informations to a central processing unit (12, 16),
    c) calculating in said central processing unit on the basis of said first and second topographic informations at least one volume of said joining gap (1),
    d) generating, based on said at least one volume of said joining gap (1), a dosing control signal,
    e) controlling with said dosing control signal a gap filler material supply and dosing device to provide a quantity of a gap filler material, said quantity corresponding to said at least one volume of said joining gap (1),
    f) filling said quantity of said gap filler material into at least one topography of said first and second joining surface areas, and
    g) joining said first and second structural components to each other whereby said gap filler material completely fills said joining gap to prevent the formation of air inclusions in the joint.

2. The method of claim 1, wherein said calculating step comprises adding said first and second topographic informations.

3. The method of claim 1, wherein one of said first and second topographic informations is zero because the respective joining surface area is plane.

4. The method of claim 1, further comprising in said scanning step controlling a motion of a scanning beam to cover a respective one of said joining surface areas being a rectangular joining surface area.

5. The method of claim 1, comprising providing said quantity of said filler material as filler material pieces having a combined volume corresponding to said volume of said joining gap (1, 1A, 1B, 1A', 1A", 1B' or 1B") as calculated in said central processing unit.

6. The method of claim 5, further comprising cutting said filler material pieces from a continuous length of filler material.

7. The method of claim 5, further comprising shaping said filler material pieces into a configuration approximately complementing said at least one topography.

8. The method of claim 5, further comprising coating said filler material pieces with an adhesive bonding material.

9. The method of claim 1, comprising providing said filler material in the form of one of a powder and a paste.

10. The method of claim 1, further comprising transporting said quantity of said gap filler material from said gap filler material supply and dosing device (16) to at least one of said first and second joining surface areas.

11. The method of claim 1, further comprising using as said first structural component one of a thick walled skin and a cover section of one of fiber composite materials and metals, and using as said second structural component one of a stringer, a girder, a beam and a spar of one of fiber composite materials and metals.

12. The method of claim 8, wherein said adhesive bonding material is a resin.

13. The method of claim 1, further comprising performing a thermal welding along an edge of one of said first and second structural components to form a closed seam.

14. The method of claim 1, further comprising using at least one laser beam for said scanning.

\* \* \* \* \*